United States Patent
Daasvatn et al.

(10) Patent No.: US 11,577,180 B2
(45) Date of Patent: Feb. 14, 2023

(54) SUBSEA PROCESSING OF CRUDE OIL

(71) Applicant: Subsea 7 Norway AS, Stavanger (NO)

(72) Inventors: Sigbjorn Daasvatn, Hornnes (NO);
Ratnam Sathananthan, Westhill (GB)

(73) Assignee: Subsea 7 Norway AS, Stavanger (NO)

( * ) Notice: Subject to any disclaimer, the term of this patent is extended or adjusted under 35 U.S.C. 154(b) by 375 days.

(21) Appl. No.: 16/606,221

(22) PCT Filed: Apr. 18, 2018

(86) PCT No.: PCT/EP2018/059965
§ 371 (c)(1),
(2) Date: Oct. 17, 2019

(87) PCT Pub. No.: WO2018/193004
PCT Pub. Date: Oct. 25, 2018

(65) Prior Publication Data
US 2020/0139266 A1    May 7, 2020

(30) Foreign Application Priority Data
Apr. 18, 2017  (GB) ..................... 1706110

(51) Int. Cl.
*B01D 17/02* (2006.01)
*E21B 47/001* (2012.01)
(Continued)

(52) U.S. Cl.
CPC ..... *B01D 17/0214* (2013.01); *B01D 17/0205* (2013.01); *B01D 17/045* (2013.01);
(Continued)

(58) Field of Classification Search
CPC ............ B01D 17/0214; B01D 17/0205; B01D 17/045; B01D 619/0042; C02F 1/24; C02F 2103/10; E21B 43/36; E21B 4047/001
See application file for complete search history.

(56) References Cited

U.S. PATENT DOCUMENTS 2,875,833 A * 3/1959 Martin ................. E21B 43/164
166/266
4,626,360 A * 12/1986 Senyard, Sr. .......... B01D 21/00
210/260
(Continued)

FOREIGN PATENT DOCUMENTS

EP     1 554 197     5/2004
EP     1 782 870     5/2007
(Continued)

OTHER PUBLICATIONS

Kongsberg—Water in Oil Sensor (Year: 2009).*
(Continued)

*Primary Examiner* — Liam Royce
(74) *Attorney, Agent, or Firm* — Levy & Grandinetti

(57) ABSTRACT

A subsea multiphase fluid separation system has a gas separator for separating gas from a well stream containing oil. A water separation stage downstream of the gas separator has at least one dual pipe separator for separating water from the oil of the wellstream. A water treatment system for cleaning oil from water is produced by the water separation stage. On an oil outlet path, downstream of the or each dual pipe separator, there is an electrocoalescer and at least one second separator in series.

22 Claims, 11 Drawing Sheets

(51) Int. Cl.
  *B01D 17/04* (2006.01)
  *B01D 17/06* (2006.01)
  *B01D 19/00* (2006.01)
  *C02F 1/24* (2006.01)
  *E21B 43/36* (2006.01)
  *E21B 43/40* (2006.01)
  *C02F 103/10* (2006.01)

(52) U.S. Cl.
  CPC ......... *B01D 17/06* (2013.01); *B01D 19/0042* (2013.01); *C02F 1/24* (2013.01); *E21B 43/36* (2013.01); *E21B 43/40* (2013.01); *E21B 47/001* (2020.05); *C02F 2103/10* (2013.01)

(56) References Cited

U.S. PATENT DOCUMENTS

| | | | |
|---|---|---|---|
| 2006/0124313 | A1 | 6/2006 | Gramme |
| 2010/0180768 | A1* | 7/2010 | Folkvang ............... B04C 5/103 210/194 |
| 2012/0160103 | A1 | 6/2012 | Suppiah et al. |
| 2015/0343327 | A1* | 12/2015 | Skovholt ............ B01D 17/0208 29/407.01 |
| 2015/0345275 | A1* | 12/2015 | Sathananthan ......... E21B 43/36 210/175 |
| 2016/0138762 | A1 | 5/2016 | Becquin et al. |
| 2018/0073343 | A1* | 3/2018 | Skovholt .............. B01D 17/047 |

FOREIGN PATENT DOCUMENTS

| | | |
|---|---|---|
| GB | 2 394 737 | 5/2004 |
| WO | WO 03/033872 | 4/2003 |
| WO | WO 2004/007908 | 1/2004 |
| WO | WO 2004/016907 | 2/2004 |
| WO | WO 2005/005777 | 1/2005 |
| WO | WO 2006/098637 | 9/2006 |
| WO | WO 2007/085900 | 8/2007 |
| WO | WO 2007/140151 | 12/2007 |
| WO | WO 2008/051087 | 5/2008 |
| WO | WO 2011/051453 | 5/2011 |
| WO | WO 2013/179252 | 12/2013 |
| WO | WO 2014/095941 | 6/2014 |
| WO | WO 2014/095942 | 6/2014 |
| WO | WO 2014/096330 | 6/2014 |
| WO | WO 2014/096356 | 6/2014 |
| WO | WO 2015/167778 | 11/2015 |
| WO | WO 2016/071471 | 5/2016 |
| WO | WO 2016/108697 | 7/2016 |
| WO | WO 2016/148577 | 9/2016 |
| WO | WO 2016/195842 | 12/2016 |
| WO | WO 2017/001567 | 1/2017 |
| WO | WO 2017/010892 | 1/2017 |
| WO | WO 2017/027943 | 2/2017 |

OTHER PUBLICATIONS

Guide to Oil in Water Monitoring—Can-Am Instruments (Year: 2014).*
Rassenfoss, S., "Growing offshore water production pushes search for subsea solutions," Journal of Petroleum Technology, Aug. 2011.
Orlowski, R. et al., "Marlim 3 Phase Subsea Separation System—Challenges and Solutions for the Subsea Separation Station to Cope with Process Requirements," Offshore Technology Conference, Apr. 30-May 3, 2012, Houston, Texas.
Schuemann, H., "Seabed Separation—the low pressure testing of the dual pipe separator concept (DPS)," Sintef Multiphase Lab, Jun. 10, 2016.

* cited by examiner

SUBSEA PROCESSING OF CRUDE OIL

This invention relates to subsea processing of crude oil, especially to separate water from a subsea wellstream for the purpose of flow assurance and to dispose of that water without damaging the marine environment.

Specific aspects of the invention relate to the challenges of developing marginal subsea oil fields, including small, remote or inaccessible fields. To address those challenges, the invention aims to reduce the cost of production and related capital investment. The invention also eases the installation and operation of the necessary subsea infrastructure.

A typical subsea oil production system comprises production wells each with a wellhead, pipelines running on the seabed, structures to support valves and connectors, manifolds and risers to bring production fluids to the surface. At the surface, a topside installation that can be a platform or a vessel receives the production fluids before their onward transportation.

Crude oil is a multiphase fluid that generally contains sand, oil, water and gas. These components of the wellstream interact in various ways that tend to decrease the flow rate in the production system, from the wellhead to storage. A critical failure mode in crude oil production is clogging or plugging of pipelines by solids because remediation of such blockages can be extremely expensive, especially in deep water.

When the temperature of a wellstream decreases below a certain threshold, at a given pressure, components of crude oil may react together or individually to coagulate or precipitate as solid wax, asphaltenes or hydrates that could plug a pipeline. For example, wax will typically appear in oil at a temperature of around 30° C.

As crude oil is hot at the outlet of the wellhead, typically around 200° C., one approach in subsea oil production is to maintain the oil temperature above the critical threshold until the oil has been delivered to a topside installation. There, the oil can be treated to allow the treated oil to be transported at ambient temperature in tankers or in pipelines. For example, multiphase separation may be performed at the topside installation, as disclosed in WO 2015/167778. WO 2007/085900 discloses another typical topside separation unit, in that case comprising gravity tanks and at least one pump.

Two main approaches are known in the art to reduce the cost of producing oil from subsea fields, especially marginal subsea fields. The first approach is to simplify subsea equipment as much as possible, for example by using a long, insulated pipeline extending from a wellhead and minimal additional equipment subsea. The second approach adopts an opposite tactic, namely to transfer at least some conventionally-topside production and storage functions to a subsea location for intermittent export of oil by tanker vessels. For example, EP 1554197 discloses the use of a subsea storage tank as temporary storage, inside which oil and water in the wellstream will eventually separate.

A challenge of the first approach is that pipeline cost becomes a large element of development cost where fields are isolated or remote. In this respect, conventional solutions to maintain oil temperature employ 'wet' thermal insulation, which involves covering the pipeline with thermally-insulating materials. The pipeline may also be heated by electrical heating or by heat transfer from hot fluids. However, as some pipelines may be very long, for example longer than 100 km, such solutions can become very expensive.

Also, in view of oil viscosity, it may be necessary to employ boosting or multiphase pumping to manage slugs in pipelines. For example, WO 2011/051453 and WO 2007/140151 disclose booster pump systems. The use of booster multiphase pumps may maintain sufficient pressure in the flow to avoid plugging but it does not allow a sufficient reduction of coating thickness to overcome the related disadvantages in long pipelines.

For these reasons, the present invention is concerned with the second approach, which involves subsea processing and storage of produced oil. By displacing at least some oil processing steps from the topside to the seabed, thermal insulation or heating can be reduced and ideally, in principle, removed. The invention is particularly concerned with the challenges of dealing with a wellstream that is of insufficient quality to be stored and transported, which makes it necessary to process the wellstream subsea.

The prior art features several proposals for subsea processing in connection with the exploitation of subsea oil fields. For example, WO 2017/001567 discloses a typical water re-injection system, in which water for injection is extracted from seawater.

Similarly, in WO 2017/010892, salt is extracted from seawater to allow re-injection of water into a well. Chemicals may also be added to the re-injected water.

In order to reduce the need for thermally-insulating coating or for heating of pipelines, 'cold flow' technologies are being developed. The principle of cold flow relies upon removing as much water as possible from the wellstream so that coalescing or deposition of wax, asphaltene or hydrates does not start or at least can be mitigated before plugging of the pipeline occurs. The Applicant's WO 2014/095941 describes an example of a cold flow installation. WO 2016/195842 discloses other types of cold flow reactors.

Subsea water/oil separation systems are known in the art but their performance is not sufficient for cold flow installations. The subsea separation process as a whole has to be improved over such prior art to reach an appropriate level of performance, which may be expressed in terms of the Water-in-Oil (WiO) ratio.

Efficient water/oil separation systems are known for topside or onshore use. However they tend not to be a good solution for subsea use because of the difficulty of supplying high electrical power under the sea over long distances. For this reason: hydrocyclone-based separation should be avoided. Also, such separators need maintenance that cannot be done practically subsea. Gravity separators should also be avoided because they require atmospheric pressure, which would prevent the production fluid flowing up to the surface.

More generally, there is a need in so-called 'brownfield' developments to improve the flow conditions within existing tie-back lines due to gradually-increasing production of water over the lifetime of a subsea field. Also, as areas mature, new reservoirs are revealed, and new wells are either daisy-chained or tied-in towards existing tie-back lines. Alternatively, new fields are tied-back to existing facilities, with large associated topside costs.

In these circumstances, the additional flowrate can lead to 'overflooding' of the existing lines as those lines are not designed to handle the additional producers. The conventional way of dealing with this has been to lay new lines or to choke some producers to address the problem temporarily at the seabed, and then to effect topside modifications to add separation capacity. The latter can be extremely expensive.

A particular issue is that as many subsea fields mature, the typical increase in water production in the wellstream over time will increase the need to dispose of that water, which generally contains oil. This is against the background of ever more stringent environmental regulations, which mean that the Oil in Water (OIW) ratio is typically much too high to allow the produced water to be released directly into the sea. In general, therefore, water produced after separation has been treated by injecting chemicals, stored subsea or recovered to the surface by a water pipeline. None of those solutions are wholly desirable, either economically or environmentally.

In some field developments, the strategy has been to avoid production of water to the surface by using down-hole water separators. These separate water from oil or gas streams down-hole for dissipation into suitable geological formations. Whilst these solutions can eliminate production of waste water, they are not always practically possible or economically viable.

Another way to manage produced water is to inject the produced water into the petrological formation from which it came, or into another suitable formation. This involves transporting produced water from the producing site to the injection site, and pumping to achieve a suitable injection pressure. It also increases the risk of oily water escaping into the sea.

WO 2016/108697 teaches a combination of subsea separation units for removal of sour components, in particular sour gas, from an oil stream in order to reduce corrosion of subsea piping and equipment. However, this does not remove enough water from the oil to allow subsea storage of the oil.

WO 2008/051087 discloses a subsea water-oil separation system for water re-injection. Its teaching is to heat the separator to improve the water-cut in oil.

US 2016/138762 discloses another subsea processing arrangement that injects a catalyst chemical and then separates that chemical.

Whilst compact subsea production units are known, there remains a need for simpler systems that will allow cost-effective development of small, remote oil fields.

WO 2017/027943 discloses an integrated compact station with subsea fluid separation and pumping systems. Separation of a wellstream is effected by a harp-type gravitational gas-liquid separator to separate gas from liquid and by a liquid-liquid separator to separate water from oil.

In some embodiments of WO 2017/027943, the liquid-liquid separator may have a frusto-conical section with a series of control valves. A hydrocyclone is preferred. Conversely, in another embodiment of WO 2017/027943, a horizontal gravitational pipe separator performs liquid-liquid separation. However in that latter embodiment, the pipe separator is located outside, and connected to, the compact structure because the pipe separator takes significant space. Thus, WO 2017/027943 teaches that the pipe separator is too bulky to be integrated within the structure and so has to be separated from the structure when a pipe separator solution is chosen for liquid-liquid separation.

A harp-type gas separator is also disclosed in WO 2006/098637, which focuses on gas separation and also teaches combining the harp separator with a pipe separator for liquid-liquid separation.

WO 2005/005777 discloses a conventional pipe separator whose separation efficiency is insufficient for the purpose of cold flow.

WO 03/033872 discloses a system comprising a pipe separator and an electric coalescer that, beneficially, has no moving parts. However, this approach also achieves poor separation efficiency and requires a pump to repressurise the fluid because of head loss. WO 2013/179252 also discloses an electric coalescer like that of WO 03/033872.

A coalescer is usually mounted downstream of a water/oil separator. However, in WO 2004/007908, a coalescer is located upstream of a water/oil separator to produce bigger droplets that are more easily separated in the separator.

WO 2014/096330 describes a dual pipe separator or DPS, referred to in that document as a tubular oil separator, which differs from a standard pipe separator in that the separator is inclined for greater efficiency. A DPS is also more compact than a pipe separator.

WO 2016/148577 relates to a system and method for subsea purification of produced water, in which oil, gas and sand are passively separated in a tank assembly by means of gravity before the purified water is released into the sea.

Against this background, the invention provides a subsea multiphase fluid separation system. The system comprises: a gas separator for separating gas from a wellstream containing oil; a water separation stage downstream of the gas separator, comprising at least one inclined dual pipe separator for separating water from the oil of the wellstream, which at least one dual pipe separator comprises a perforated inner pipe contained within an outer pipe; a water treatment system for cleaning oil from water that is produced by the water separation stage; and a water-in-oil sensor downstream of the water separation stage.

The gas separator and the water separation stage may be arranged substantially without moving parts to separate gas and water from the wellstream passively.

The water separation stage further comprises an electrocoalescer and at least one second separator in series, downstream of the or each dual pipe separator on an oil outlet path. In that case, the water treatment system may be connected to water outlet paths from the or each dual pipe separator and from the or each second separator. The second separator may comprise at least one dual pipe separator, for example a first array of parallel dual pipe separators upstream of the electrocoalescer and a second array of parallel dual pipe separators downstream of the electrocoalescer. The second array may contain fewer dual pipe separators than the first array.

An oil-in-water sensor is suitably positioned downstream of the water treatment system.

The water treatment system may comprise a gas inlet communicating with the separation system and may be arranged to mix the produced water with gas separated from the oil.

The water treatment system may have a further input to receive water settling in a storage tank.

The water treatment system suitably comprises at least one flotation unit having: a water inlet for water to be cleaned of oil; a water outlet for water cleaned of oil; and a reject outlet for gas mixed with oil cleaned from the water. The water treatment system may comprise first and second flotation units in series, the water outlet of the first flotation unit communicating with the water inlet of the second flotation unit. The water inlet of the or each flotation unit communicates with a mixer for mixing gas with water to be cleaned of oil.

The water treatment system suitably comprises a discharge outlet for discharge of cleaned water into surrounding seawater. Alternatively, or additionally, the water treatment system may communicate with a water injection system for injecting the cleaned water into a subsea reservoir. In that case, the water injection system may comprise a gas inlet communicating with the gas separator and so may be arranged also to receive and inject gas separated from the wellstream. The water injection system suitably comprises a processed water inlet communicating with a seawater processing system and so may be arranged also to receive and inject processed water drawn from surrounding seawater.

A pre-separator pipe section is suitably positioned upstream of the or each dual pipe separator. A sand removal unit is suitably positioned upstream of the gas separator, in which case a retrievable sand storage tank may be provided for receiving sand from the sand removal unit.

Conveniently, the gas separator, the water separation stage and the water treatment system are implemented on a common supporting frame. In that case, components of the gas separator, the water separation stage and the water treatment system may be modularly replaceable subsea by lifting, without lifting the frame. For this purpose, the frame suitably defines upwardly-opening silos arranged to accommodate the respective components. The components may be supported in respective transport and installation structures that are engageable with the silos of the frame for vertical movement relative to the frame on installation or removal. The frame is suitably a unitary structure that is transportable by towing or lifting while supporting components of the gas separator, the water separation stage and the water treatment system.

The inventive concept also embraces a method of separating fluids from a multiphase oil-containing wellstream. The method comprises performing the following steps subsea: separating gas from the wellstream; subsequently, separating water from the oil of the wellstream by passing the wellstream through at least one inclined dual pipe separator, which at least one dual pipe separator comprises a perforated inner pipe contained within an outer pipe; and cleaning oil from the separated water. Gas and water may, for example, be separated from the wellstream passively.

Oil from the or each dual pipe separator is passed through, in succession, an electrocoalescer and at least one second separator. Oil may be cleaned from separated water flowing from the or each dual pipe separator and from the or each second separator.

The water-in-oil ratio may be sensed after the water separation step. The oil-in-water ratio may be sensed after the cleaning step.

The cleaning step may comprise mixing the separated water with gas separated from the wellstream in the separation step. The cleaning step may also be performed on water settled from oil produced by the method of the invention.

The cleaning step is suitably performed by passing the separated water through at least one flotation unit, and may be performed by passing the separated water through first and second flotation units in series, the water output from the first flotation unit being input to the second flotation unit.

Separated water may be discharged into surrounding seawater after cleaning, in which case the water-in-oil ratio of the discharged separated water is suitably maintained below 30 ppm. Alternatively, or additionally, separated water may be injected into a subsea reservoir after cleaning. Optionally, processed water drawn from surrounding seawater and/or gas separated from the wellstream in the separation step is injected with the separated water.

The wellstream may be conditioned in a pre-separator pipe section downstream of gas separation and upstream of the dual pipe separator.

The invention separates the wellstream efficiently to enable subsea storage and offloading of oil. The result is a flexible, low-cost subsea field development with low power consumption that requires a minimum of resources to develop anywhere in the world. It is also simple to relocate the apparatus of the invention between subsea oil fields when one field has been exhausted and another marginal field elsewhere is to be exploited.

Embodiments of the invention introduce a manifold, sand removal, a separation process, a water treatment process and a water and gas injection process. Power may be provided via either a submerged power buoy or a power and control umbilical.

Initially, in embodiments of the invention, the manifolded wellstream flows through a cyclonic de-sander that reduces the effect of any sand entrained in the wellstream. Any sand collected by the de-sander may, for example, be dumped into a removable sand storage tank.

Next, the wellstream flows through a gas-separation unit, preferably a marinised harp gas separator, to remove a major portion of gas from the wellstream. This improves the effectiveness of subsequent separation of water from oil.

Then, the degassed liquid part of the wellstream flows into at least one dual pipe separator (DPS), preferably a parallel array of DPSs, from which oil will then flow directly into a subsea oil storage tank, for example inside an inflatable bag. The oil storage tank is suitably towable, preferably being supported by the same rigid frame that supports other elements of the system.

Water from the DPS is fed into a marinised water treatment system. The water treatment system comprises one, two or possibly more Compact Flotation Unit (CFU) stage(s) to enable reinjection of produced water containing oil at a level of, preferably, <100 ppm, or subsea discharge of produced water containing oil at a level of, preferably, <30 ppm.

Gas can be added to the produced water line upstream of a water injection pump. The water injection pump may be a single-phase pump or a multiphase pump but can typically handle up to 10% gas by volume mixed with the produced water.

Only a bulk separation of oil and water is necessary before oil is stored in the storage tank. Typically, therefore, the oil flowing into the storage tank will still contain 5%-10% water by volume. Thereafter, the tank will work as a settling tank, which separates water from the oil effectively to an export quality.

Water accumulating in the lower part of the storage tank may be pumped back to the process upstream of the water treatment system. Conversely, any gases collecting at the top of the storage tank may be flushed back to the produced water line upstream of the water injection pump.

Offloading of oil from the storage tank to a transport tanker at the surface may be effected via a flexible offloading system in shallow water. If the water is too deep for that solution to be used, a deep-water riser system may be used instead in combination with an offloading system at its upper part.

Processing units may be integrated into the system by means of transport and installation frames allowing modular plug-and-play functionality. The entire plant, or certain key components of the plant, are suitably located inside a supporting frame as a subsea production unit.

In principle, as noted above, other water separator designs like gravity separators or pipe separators could be used for bulk separation. However, such separators are too bulky for the purposes of the invention. Similarly, hydro-cyclone technologies could be applied for cleaning of water but it would be challenging to provide sufficient power for such equipment subsea. Also, the handling of sand is simplified in the system of the invention.

In summary, therefore, embodiments of the invention provide a compact system for subsea treatment and storage of oil. The system comprises a frame, that frame comprising or supporting a multiphase separation unit and a water treatment unit. Conveniently, the units may be replaceable subsea without lifting the frame.

The multiphase separation unit suitably comprises, in succession: a sand removal unit; a gas-separation unit, preferably a harp gas separator; and a water-oil separation unit. A retrievable sand storage tank may be included to hold particulate material output by the sand removal unit.

The water treatment unit suitably comprises at least one pump.

A subsea storage tank, which may be heated, may be provided for receiving oil from the multiphase separation unit. Conveniently, the subsea storage tank can also be mounted on the frame.

The subsea storage tank suitably comprises outlets for residual water and gas that settle in that tank and return lines leading from those outlets to, respectively, the water treatment unit and a gas outlet. Conversely, an oil outlet of the storage tank suitably feeds a riser or export line for supplying oil to a tanker vessel at the surface.

The frame may also comprise or support a water reinjection unit, Such a unit suitably mixes gas with water and re-injects that water via a dedicated well.

Any or all of the above components or units may be mounted on the same frame.

A control system suitably monitors all of the units and actuates relevant valves to ensure correct operation. The control system may be controlled from the surface and/or may be automated.

The invention provides a subsea water management system that combines seabed bulk separation with associated treatment of produced water. The objective of this process is to remove bulk water from an existing flowline system to make space for more hydrocarbons.

Bulk separation of water followed by subsea water treatment for dumping or re-injection is an effective way of increasing the use of existing subsea infrastructure in brownfield areas. As noted above, new discoveries increase the requirement for additional flowline tie-backs for well streams. By virtue of the invention, the use of existing infrastructure can be considered instead of having to install new tie-backs in this situation.

A common location for the water management system of the invention will be at the end of an existing tie-back line from an existing subsea field. A manifold suitably gathers well streams at a central location upstream of the flowline to be used. If additional well streams are being co-mingled with already existing infrastructure, subsea tie-in points must be developed to connect the in-field flowlines to the manifold before entry into the common transport line.

In general, optimising the position of the water management system will depend upon the layout of the particular field. It is advantageous to enable a flexible connection without having to re-build much of the existing structure. In that case, large savings of both cost and time may be achieved by increased utilisation of existing infrastructure instead of laying new pipelines for new well streams. In addition, any residual water can be handled easily at the surface, without large topside modification costs.

Embodiments of the invention provide a complete subsea factory on the smallest possible scale. The invention differs from known cold flow solutions in that a wax control unit and tie-back lines are avoided by adding subsea storage units and an offloading system instead. As there is no need for tie-back lines, there is no need for booster pump stations and there is much less need for chemicals. Consequently, the invention reduces overall power and chemical consumption dramatically in comparison with existing cold flow solutions.

Whilst some embodiments of the invention are particularly apt to be used in smaller fields, their solutions are relevant also for exploiting larger fields.

The invention also provides a subsea multiphase fluid separation system. The system comprises: a harp separator for gas separation; and a water-oil separation stage, the water-oil separation stage comprising at least one dual pipe separator; and a water treatment system. The water treatment system may be capable of ensuring that the residual oil in water concentration, after water treatment, is below 10 ppm.

The system need not contain moving parts, hence relying upon passive separation, and need not comprise a pump.

The water treatment system may comprise a water outlet to the sea and/or a water line, for example leading to another subsea location or to the surface.

The water-oil separation stage may further comprise an electrocoalescer and a second separator in series. Preferably the second separator comprises a second dual pipe separator. It is also possible for elements of the water-oil separation stage to be, in series, a dual pipe separator, a coalescer and a single pipe separator.

The elements of the system may be mounted on a unique frame, or in, or on, a common structure.

A monitoring system at the outlet of the water treatment system suitably measures the Oil-in-Water ratio and controls the flow rate to each element of that system.

Similarly, a monitoring system suitably measures the Water-in-Oil ratio at the outlet of the water-oil separation stage and controls the flow rate to each element of that stage.

Thus, the invention recognises the benefit of separating oil and water before further wax control treatment to enable long-distance transport. A reduction of the WiO content to below 1% may be beneficial to reduce the amount of chemicals required to avoid the formation of hydrates along a long-distance tie-back line at ambient temperature.

It is challenging to separate out the residual 1% to 2% of water from oil before long-distance transport. Subsea separation of water from oil to a sufficiently low level is achieved in the invention by applying a set of processing functions as described herein. The well stream flows through a gas harp to remove most of the gas. Then, the liquid part flows into a first-stage DPS. Oil flows through an in-line electrostatic coatescer before entering a second-stage DPS. Water enters a water treatment system that comprises one CFU stage for reinjection of water and two CFU stages for discharging water into the sea. If water is being reinjected, then gas can be added to the produced water line before a water injection pump. Alternatively gas may be returned to a multiphase flowline to be transported with oil to the host.

In order that the invention may be more readily understood, reference will now be made, by way of example, to the accompanying drawings, in which.

It should be noted that conventional piping equipment, such as some valves, may not be represented in these simplified drawings for clarity.

Figure 1:
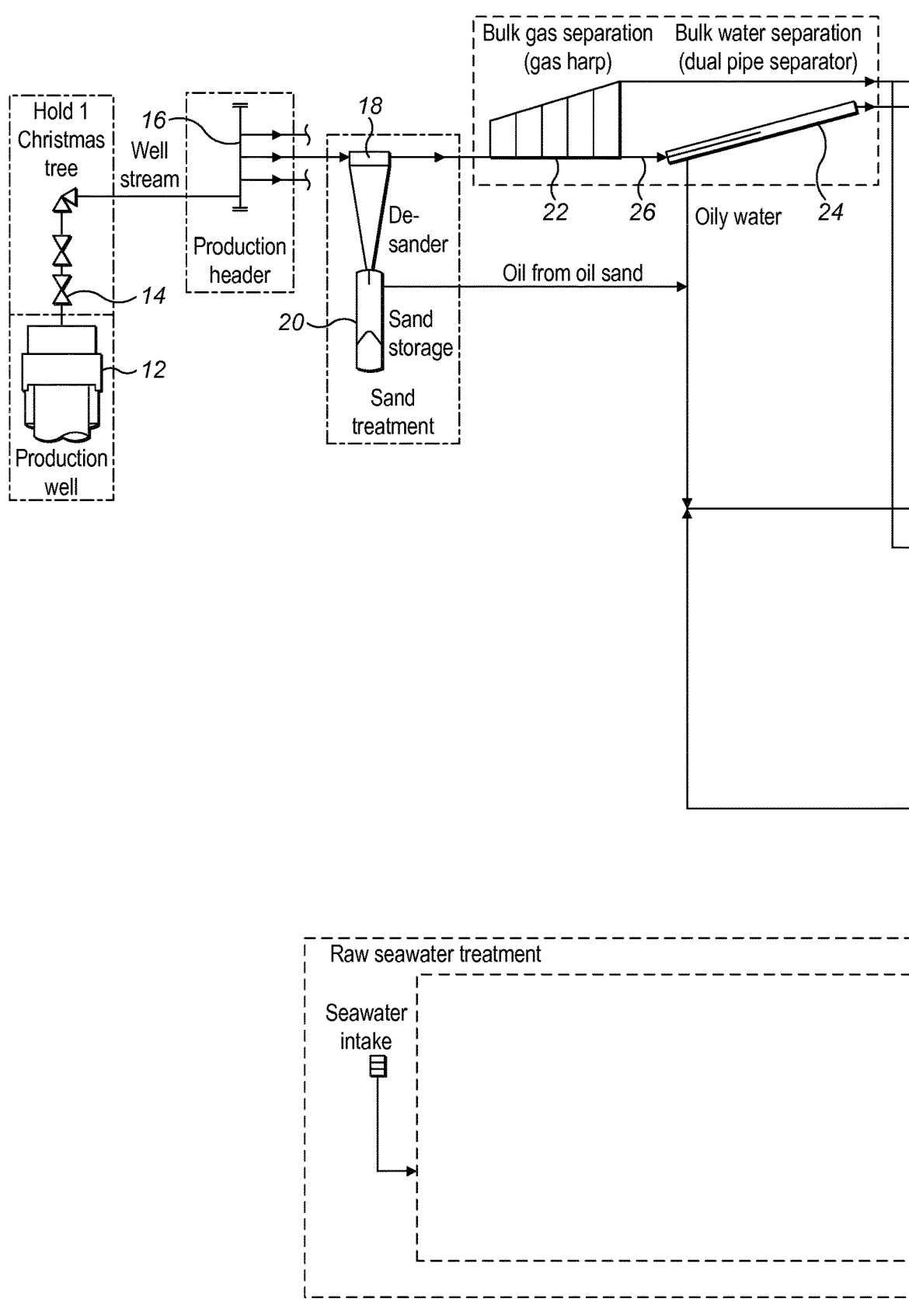
FIG. 1 is a schematic diagram of a subsea processing system in accordance with the invention.
Figure 1:
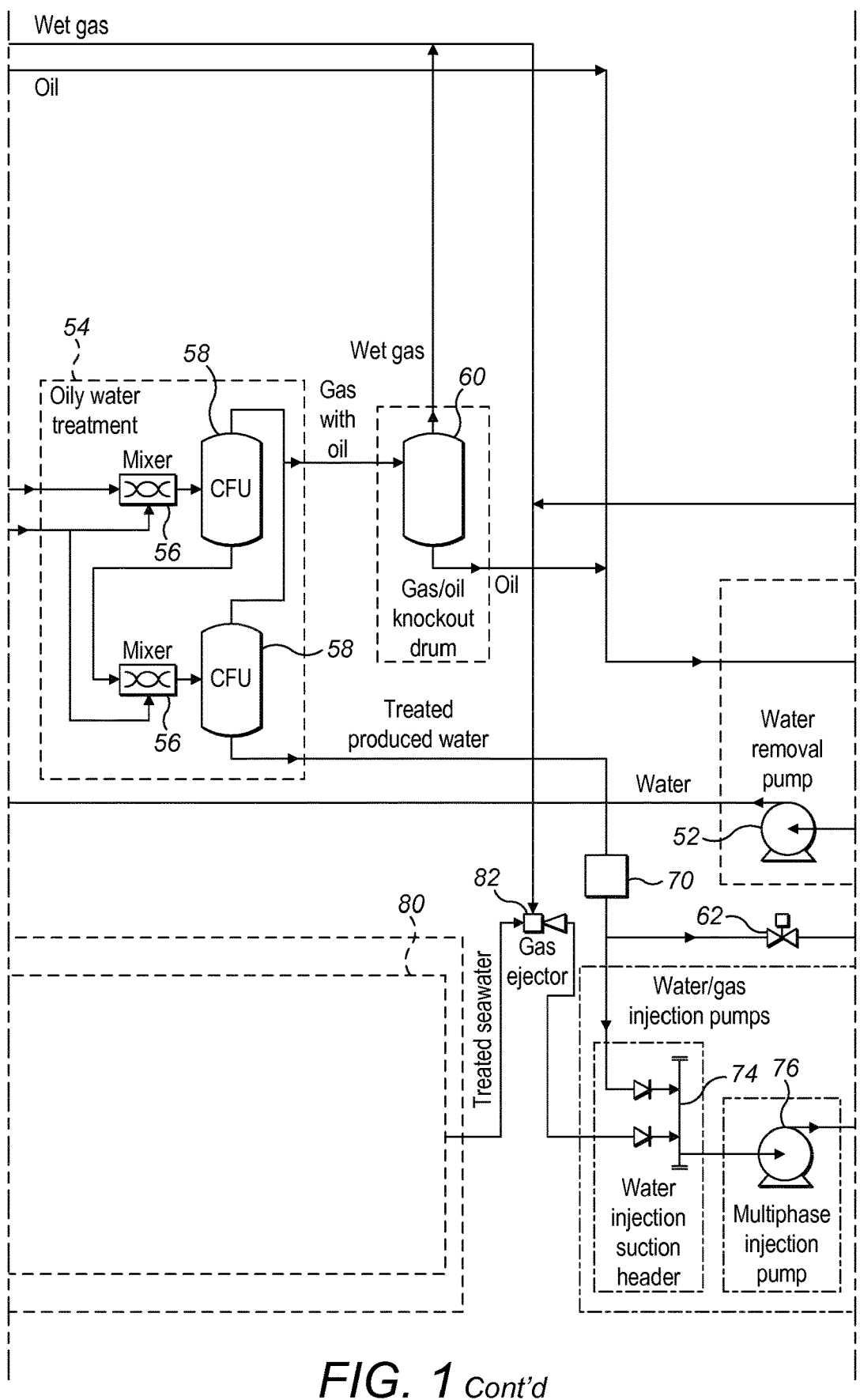
Figure 1:
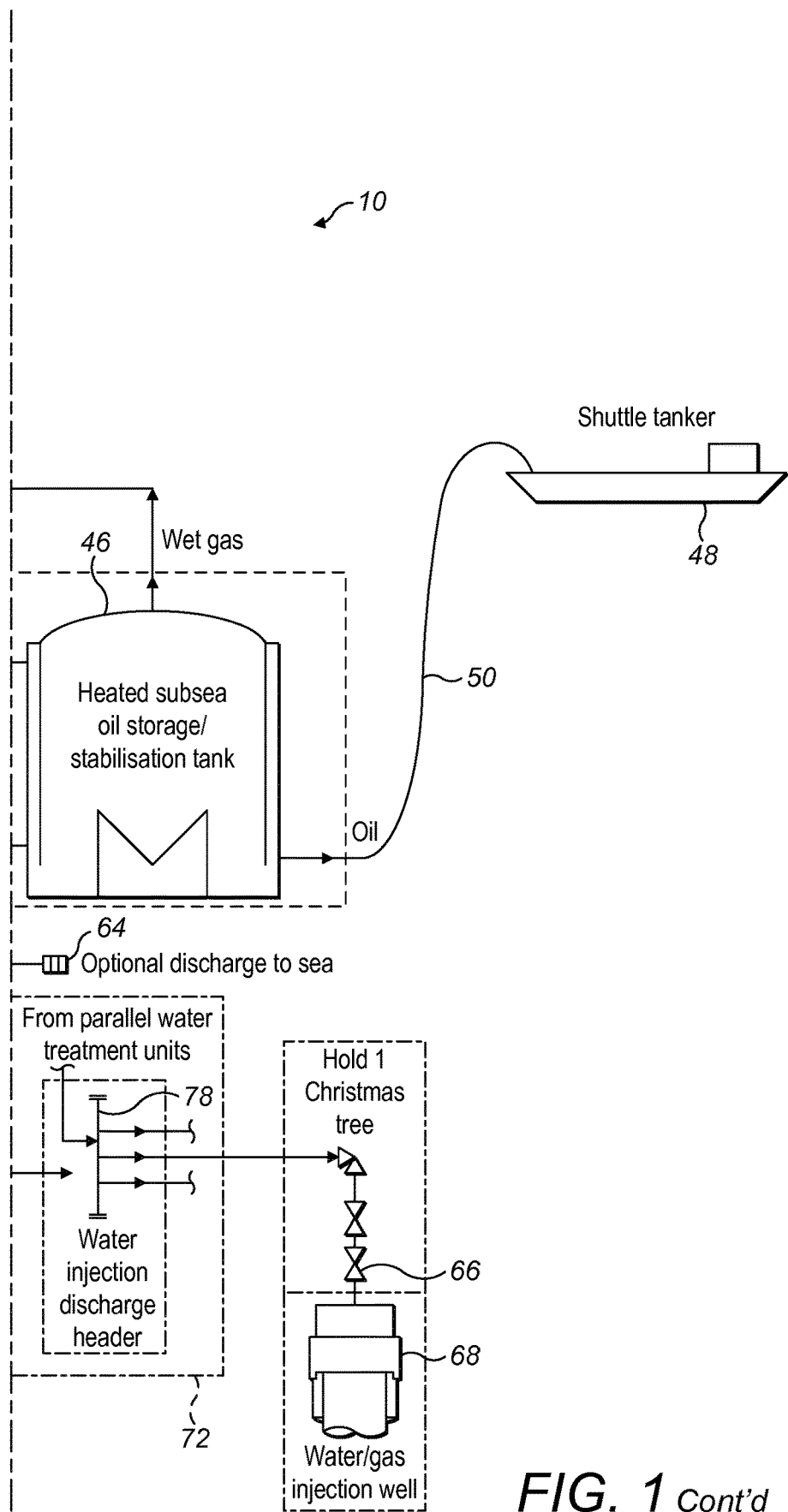

Referring firstly to the subsea processing system 10 shown in FIG. 1 of the drawings, this system has optional provisions for water discharge and for water re-injection. Water re-injection may be beneficial to maintain reservoir pressure, either to maintain or to increase production.

In the system 10 shown in FIG. 1, a wellstream of production fluids flows from a subsea production wellhead 12 via a conventional 'Christmas tree' structure 14 installed on top of the wellhead 12.

Optionally, the wellstream flows into a production header 16 that serves as a manifold to divide the flow into parallel paths. Processing of the portion of the wellstream on one of those parallel paths will now be described, it being understood that other portions of the wellstream on the other paths may undergo similar parallel processing steps. The outputs of those parallel processing steps may be combined at any convenient stage.

Initially, the wellstream may flow through a cyclonic de-sander 18 to remove substantially all of the sand that may be entrained in the production fluids. Such sand could otherwise promote erosion, corrosion or clogging of the pipework and equipment downstream. Other de-sanding technologies are known, for example those that employ gravity.

Conventionally, sand management generally relies upon down-hole systems such as sand screens or gravel packs. However, such down-hole systems cannot always be used because they can impair production. Even when down-hole systems are used, any failure that causes sand to be produced will have to be managed by back-up systems.

Oily sand removed by the de-sander 18 is conveniently dumped into a removable sand storage tank 20, which can be raised to the surface periodically for topsides treatment or disposal of the sand within and to be replaced with an empty sand storage tank 20. This solution is practical for low to moderate rates of sand production. Higher rates of sand production can be managed by instead re-combining the removed sand with the production fluids after subsea processing, for later separation and clean-up topsides.

Next, the de-sanded wellstream flows through a bulk gas separation unit, exemplified here by a harp gas separator 22. This removes a major portion of the gas in the wellstream, which is output from an upper branch of the gas separator 22 as wet gas. Some gas will remain in the wellstream downstream of the gas separator 22, but not to a problematic extent. In any event, much of that residual gas will be removed in subsequent subsea processing steps, as will be explained.

The substantially-degassed liquid portion of the wellstream flows from the gas separator 22 into a bulk water separation unit, exemplified here by dual pipe separators (DPSs) 24 operating singly or preferably in parallel. This bulk water separation step removes a major portion of the water from the wellstream, which is output from the DPSs 24 as oily water. Typically, however, the resulting oil will still contain 5% to 10% of water by volume.

More specifically, in practical embodiments, the mainly liquid flow downstream of the gas separator 22 enters a manifold that divides the flow into a number of branches corresponding to the number of DPSs 24 in a parallel array. The number of parallel DPSs 24 may be chosen for specific installations based upon factors such as the reservoir production profile, the results of high-pressure separability tests performed on production fluids during design qualification, and requirements for flexibility through the design life of the system 10.

From the manifold, each DPS 24 is preceded by a substantially horizontal pre-separator pipe section 26 of typically 5 to 10 metres in length before the flow enters the upwardly-inclined OPS 24 itself. In this respect, reference is made to FIG. 2 of the drawings, which shows the layered flow of oil 28 and water 30 along a pre-separator pipe section 26 and the mixing characteristics of those layers 28, 30 at different points along its length.

Figure 3:
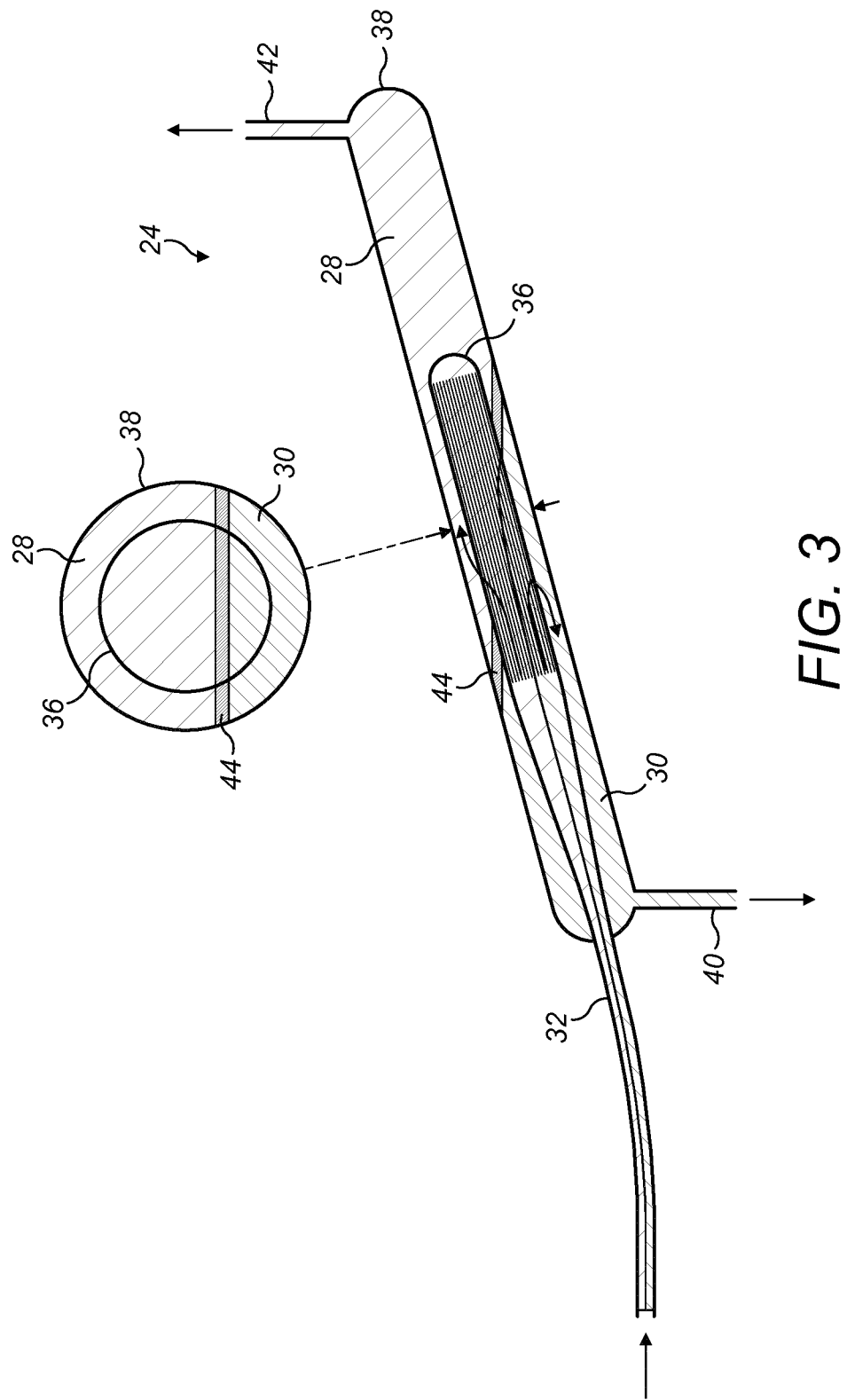
FIG. 3 is a schematic side view of a dual pipe separator in longitudinal section, which is positioned in the system of FIG. 1 immediately downstream of the pre-separator pipe section exemplified in FIG. 2.

The flow is pre-separated within the pre-separator pipe section 26 before entering the DPS 24 through an inlet 32 at the lower end of the DPS 24, as shown in FIG. 3. The flow velocity in the pre-separator pipe section 26 is controlled to be typically between 0.5 to 1.5 m/s, depending upon the length of that section. Typically, the flow will pre-separate in that section 26 for about five to ten seconds before entering the DPS 24 itself.

Figure 2:
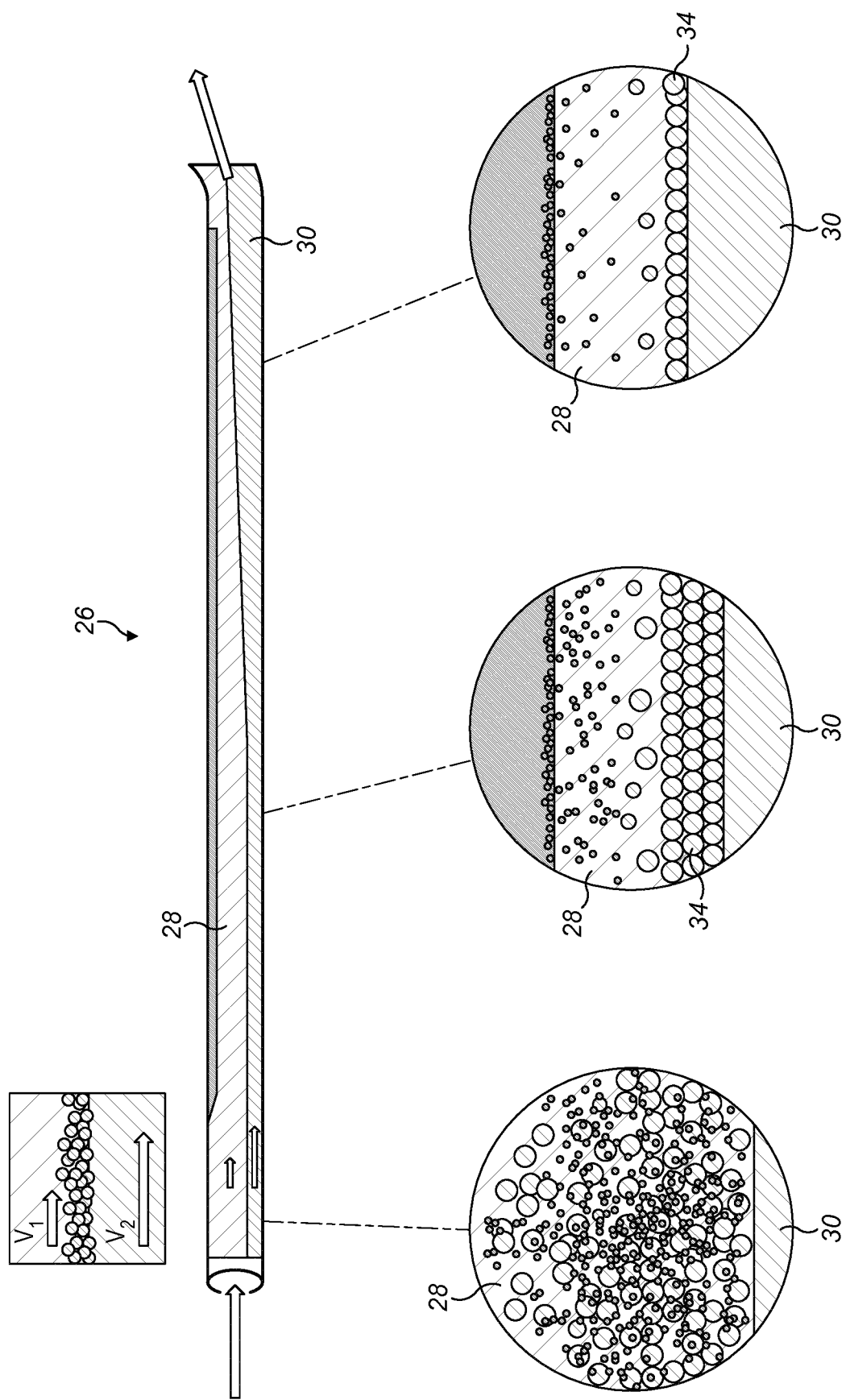
FIG. 2 is a schematic side view of a pre-separator pipe section of the system of FIG. 1, in longitudinal section.

With reference to FIG. 2, the principle underlying these pre-separation parameters arises from the observation that the established dispersion band 34, or the phase between oil 28 and water 30, diminishes rapidly if the flow velocity differs between these two principal liquid phases. This velocity requirement is fulfilled if a slightly-upward pipe bend of 10-15 degrees from the horizontal is provided at the inlet 32 of the DPS 24, corresponding to the outlet of the pre-separator pipe section 26 as shown in FIG. 2.

FIG. 3 shows that the inlet 32 of the DPS 24 carries the pre-separated oil 28 and water 30 into a flared and perforated inner pipe 36 of the DPS 24. The inner pipe 36 is concentric with and contained within a closed outer pipe 38 of the DPS 24 and extends just over halfway along that outer pipe 38.

A velocity difference between the oil 28 and the water 30 is established due to the specific gravity differences between those liquids as they climb within the upwardly-inclined DPS 24. This density difference also improves separation of water 30 dispersed in the oil 28, causing the heavier water 30 to sink and the lighter oil 28 to rise within the outer pipe 38 of the DPS 24.

The outer pipe 38 has a water outlet 40 at its lower end and an oil outlet 42 at its upper end to draw off the respective liquid outputs 28, 30. As noted above, it is inevitable that the oil output will contain some water and that the water output will contain some oil in practice.

Preferably, in practical embodiments, the geometry of the pipework between the gas separator 22 and the DPS 24 creates a liquid lock by locating the top of the water outlet 40 of the DPS 24 at substantially the same level as the inlet to the gas separator 22. This liquid lock prevents carry-under of gas and ensures that the pre-separator pipe section 26 is mainly water-filled. As incoming oil 28 is forced through the water 30 in the liquid lock, separation will occur.

The separation of water 30 from oil 28 is suitably controlled using known capacitance measurement technology. The set location of the water level in the DPS 24, being the interface of emulsion 44 between oil 28 and water 30, may be monitored to control a water outlet valve (not shown) accordingly.

The use of compact DPSs 24 ensure a small footprint, retrievability and effective separation of oil 28 and water 30. Their small-diameter pipework facilitates the use of the system 10 in the full depth range from shallow to ultra-deep waters.

It has been found to be beneficial to remove free gas from the wellstream before the remaining liquid enters the bulk water separation unit comprising the pre-separator pipe section 26 and the DPS 24. Free gas could otherwise adversely influence the flow, producing a slug flow pattern. In this respect, the vertical pipes of the harp gas separator 22 provide a large volume to absorb the fast-arriving fluids and to provide sufficient volume for the free gas. Thus, the gas separator 22 suppresses slugs to smooth the liquid flow entering the bulk water separation unit, in addition to removing the free gas.

Consequently, by separating gas from liquid in the wellstream, the bulk water separation unit performs subsequent water separation more effectively. Synergistically, the separated gas is also used for cleaning residual oil from the separated water, allowing the separated water to be discharged or re-injected as will be explained below.

Oil flowing from the DPS 24 is channelled directly into a heated subsea oil storage and stabilisation tank 46 which settles and separates in the tank 46 into an oil layer of export quality atop a layer of oily water. The oil may be offloaded periodically from the tank to a shuttle tanker 48 at the surface, via a flexible offloading system 50 in this shallow-water example. Conveniently, the shuttle tanker 48 can carry the pumping equipment that is necessary to draw oil from the tank 46.

Wet gas accumulating at the top of the oil storage and stabilisation tank 46 is drawn off to be combined with the wet gas flowing from the gas separator 22. Conversely, a water removal pump 52 draws accumulated oily water from the lower part of that tank 46. The oily water from the tank 46 is combined with the oily water output from the DPSs 24, and with any oil that may have settled out from the oily sand held in the sand storage tank 20. By way of illustration, oil may initially be present in the resulting combined flow at a level of >4500 ppm.

The oily water then enters a water treatment system 54. In this example, the water treatment system 54 comprises a series of two compact flotation unit (CFU) stages. In each stage, a mixer 56 mixes incoming oily water with some of the wet gas output from the gas separator 22. The resulting mixture of oily water and gas is then separated in a CFU 58 into an output of treated water and another output of a gas/oil mixture.

A CFU 58 is a multiphase separator that needs no moving parts and requires no external energy input. It is reliable and highly efficient in separating water, oil and gas to produce high-quality treated water, even with a short retention time.

The CFU 58 comprises a hollow cylindrical vessel that is resistant to hydrostatic pressure. That vessel defines an internal flotation chamber that is generally circular in horizontal cross-section. Incoming oily water enters the chamber substantially horizontally and tangentially to impart swirl. The separation process is aided by internal features of the vessel and by a gas flotation effect caused by the release of residual gas from the water and/or by added gas.

These combined processes act on fluid components of different specific gravities. Small oil droplets are caused to agglomerate and coalesce to produce larger oil droplets, making it easier to separate them from water. A continuous oil or emulsion layer is created at an upper liquid level of the flotation chamber, while treated water exits through the bottom of the vessel. On occasion, however, process optimisation may involve the introduction of external gas and/or flocculants.

The separated gas/oil mixture is removed continuously from the CFU 58 via an outlet pipe suspended at the top of the vessel. This multiphase reject flow may be controlled by a valve in the outlet pipe. The liquid flow rate of the reject flow is typically about 1% of the overall inlet water flow to the CFU 58, and the oil content in that liquid is typically 0.5% to 10%.

By way of example, a CFU 58 having a flotation chamber with an operational volume of just 2.4 $m^3$ can treat a water flow of up to 220 $m^3$/h (33 000 bpd). Higher flow rates can be achieved by arranging multiple CFUs 58 in parallel.

The CFU 58 in the first stage of the water treatment system produces an output of partially-treated water with a much-reduced oil content of about 100 ppm, which serves as the water input into the mixer 56 of the second stage of the system. The CFU 58 in the second stage further reduces the oil content in the partially-treated water so as to output fully-treated produced water that preferably contains oil at a level of <30 ppm, for example 9 ppm.

The outputs of gas/oil mixture from the successive CFU stages are combined and fed into a gas/oil separator 60, which is exemplified here by a gas/oil knockout drum. The gas/oil separator 60 outputs oil that may still contain a minor fraction of water. That oil is fed into the oil storage and stabilisation tank 46 to settle and separate out before being offloaded. The gas/oil separator 60 also outputs wet gas, which is combined with the wet gas flowing from the gas separator 22.

The produced water from the two-stage water treatment system 54 is clean enough to be discharged, optionally, directly into the sea via a valve 62 and a discharge outlet 64. Alternatively, the produced water can be re-injected into the well, conventionally via a Christmas tree structure 66 atop a water/gas injection wellhead 68. In that latter case, the second stage of water treatment could be omitted.

An oil-in-water sensor in a flowmeter 70 measures the oil concentration in the produced water to ensure that the concentration is below appropriate thresholds, for example <100 ppm for re-injection or <30 ppm for discharge to sea.

The ability to discharge or to re-inject the produced water saves valuable space in oil transport lines, increasing the amount of oil that can be produced using the available infrastructure. For example, bulk separation of typically 50%-75% of water from the wellstream allows for tie-in of more wells to a manifold.

Subsea discharge of produced water has other important benefits. For example, it eliminates the need to transport large volumes of water from production sites to tieback hosts, reducing the cost of the production system. This benefit increases with water depth and tie-back distance.

By decreasing hydrostatic pressure on subsea production flowlines, subsea discharge of produced water helps to reduce back-pressure on a subsea wellhead and allows for more production. The resulting effect provides additional economic benefits to justify the capital expenditure for the plant.

Subsea discharge of produced water also minimises the topside equipment footprint and so protects much of the production equipment from damage by bad weather.

For the purpose of re-injection, the produced water passes through a water/gas injection system 72. Here, the wet gas flowing from the gas separator 22, supplemented with wet gas from the gas/oil separator 60 and from the oil storage and stabilisation tank 46, is combined with the produced water to be re-injected.

In the water/gas injection system 72, the produced water is fed via a one-way valve to a water injection suction header 74, from which a multiphase water injection pump 76 draws the water and outputs the water to the Christmas tree structure 66 under pressure. The water flowing through the water injection pump 76 may contain up to about 10% gas by volume.

Optionally, as shown, the pressurised water from the water injection pump 76 flows through a water injection discharge header 78 interposed between the water injection pump 76 and the Christmas tree structure 66. The header 78 is a manifold structure that can receive water from any parallel water treatment units (not shown) and/or that can output water on parallel paths to any other injection wellheads via respective Christmas tree structures (also not shown).

Using a header 78 such as this, water injection arrangements can be tailored to the individual reservoir. Separate water/gas injection systems 72 could be located at individual wells, or high-pressure in-field lines could distribute injection fluid to multiple wells from a single water/gas injection system 72.

Where produced water flowing from the water treatment system 54 is to be re-injected, the wet gas could simply be combined with that produced water. In this example, however, sea water is also drawn from the sea and processed in a filtration and treatment plant 80 to supplement the produced water by co-mingling, for example in a venturi system, for re-injection. Thus, the wet gas is firstly mixed with the treated seawater in a gas ejector 82 and then the resulting multiphase mixture is combined with the produced water in the water injection suction header 74.

Figure 4:
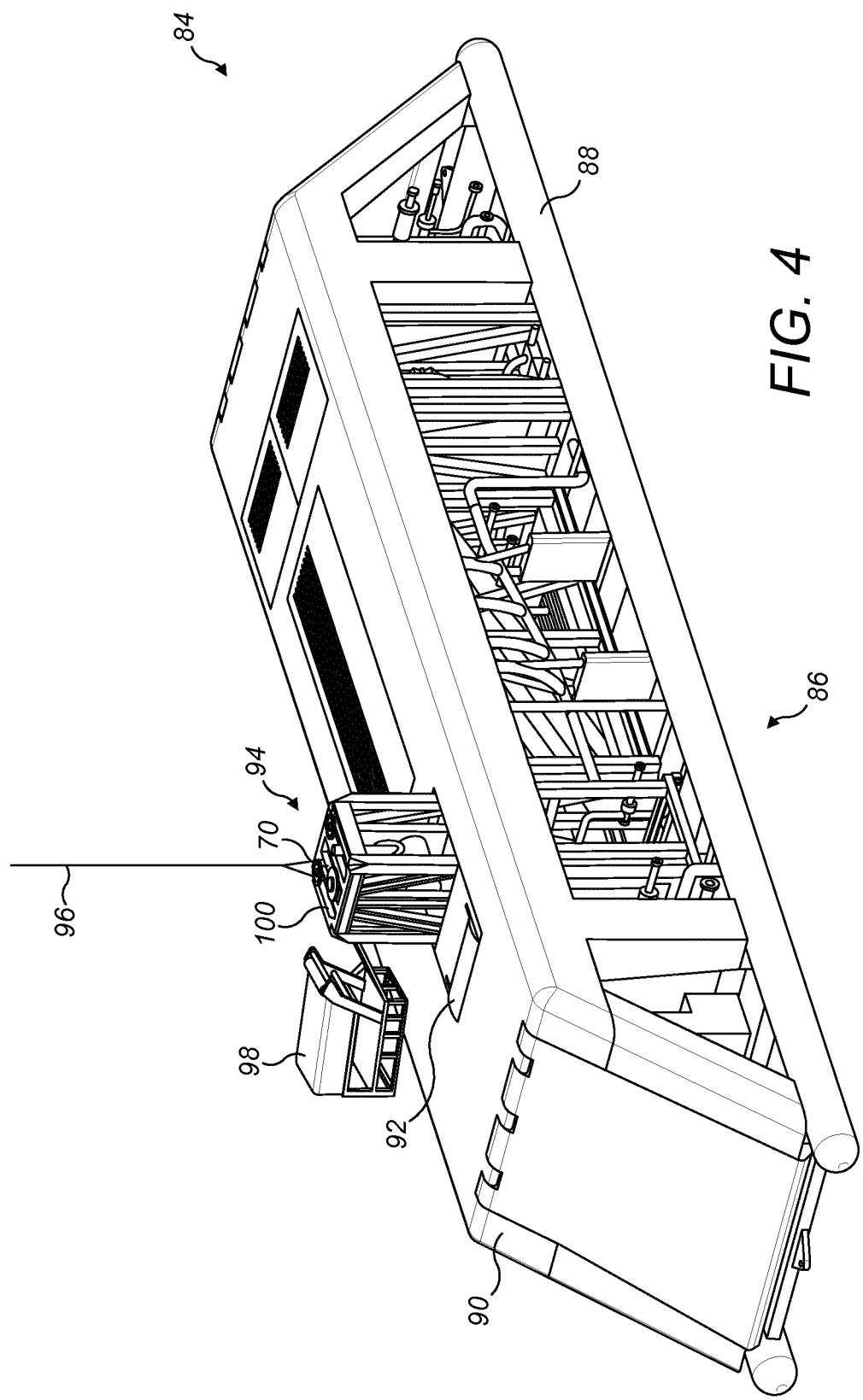
FIG. 4 is a perspective view of a subsea production unit in accordance with the invention installed on the seabed, showing a functional module being removed from a surrounding frame of the unit to be lifted to the surface for servicing.
Figure 5:
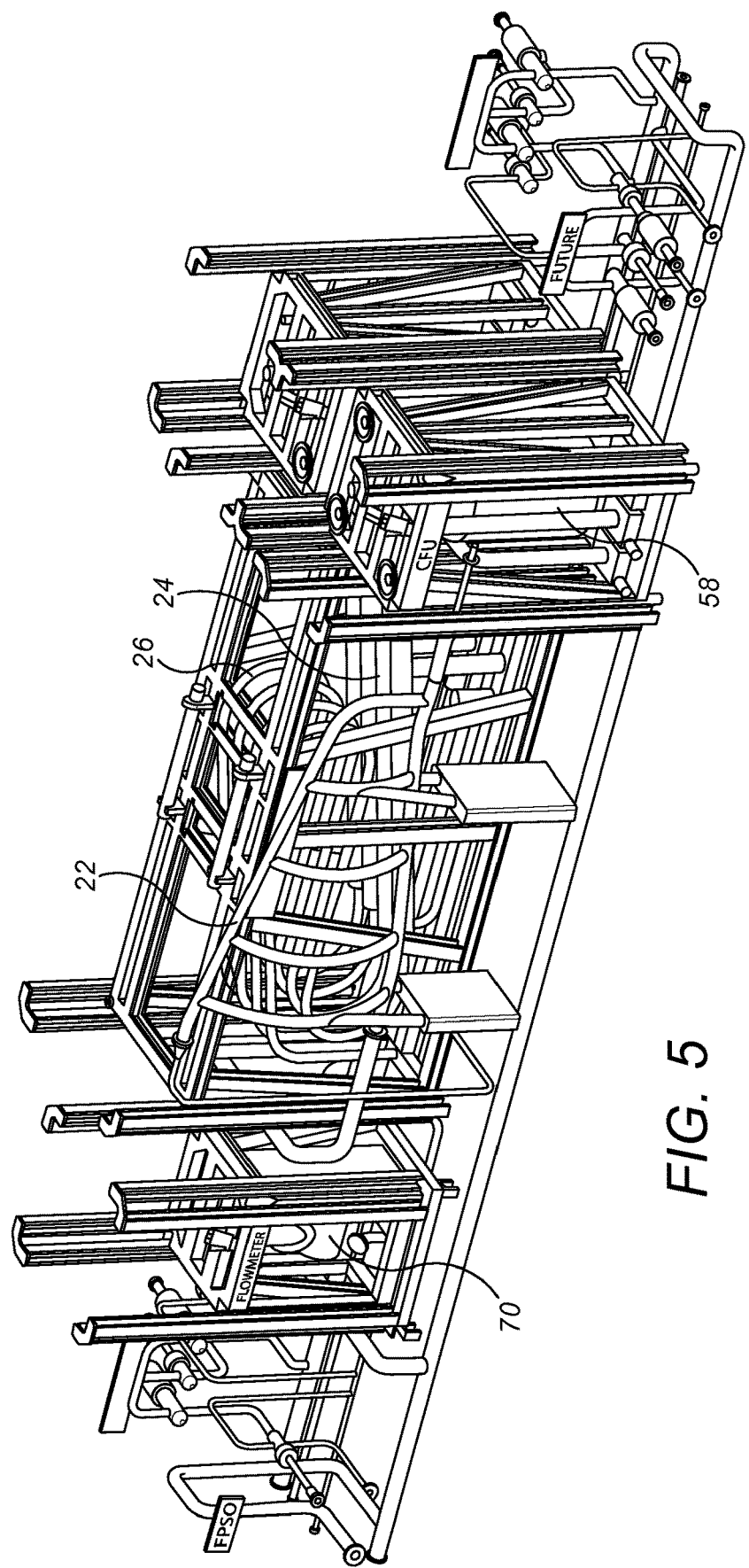
FIG. 5 is a perspective view showing the positional layout of various functional modules of the subsea production unit of FIG. 4, with the frame of the unit omitted for ease of viewing.

Moving on now to FIGS. 4 and 5 of the drawings, these show a subsea production unit 84 in a practical embodiment of the invention. Like numerals are used for like features.

FIG. 4 shows the unit 84 installed on the seabed, complete with an elongate supporting frame 86 that surrounds various functional or processing modules within the unit 84. Those modules implement the various sub-systems of the system 10 described above.

FIG. 5 omits the frame 86 for ease of viewing the positional layout of the illustrated modules. The layout shown there is an example that omits some of the modules required to implement the system 10 described above, which could be provided either onboard the unit 84 or outside and connected to the unit 84, for example on a neighbouring similarly-constructed unit installed on the seabed.

Specifically, the frame 86 of the subsea production unit 84 shown in FIG. 4 comprises a steel deck 88 that supports various processing modules and their connecting pipework. A GRP superstructure 90 is bolted together and connected to the deck 88 so that the deck 88 and the superstructure 90 together form a truss structure to carry the heavy payload of the processing plant during towing and installation. Conveniently, buoyancy required for towing the unit 84 to the production site may be pre-shaped and assembled into the superstructure 90.

Subsea production units 84 of the invention are apt to be fabricated in dry dock facilities. To maximise the choice of available fabrication facilities, it is important that the size of such units 84 is minimised. By way of example, a subsea production unit 84 as shown in FIG. 4 may have a length of about 41.3 m, a width of about 9.2 m and a height of about 7.6 m.

An advantage of the GRP/steel hybrid structure of the frame 86 is that sections of the superstructure 90 can be fabricated at a supplier's premises and shipped to the launch site to be assembled onto the foundation of the steel deck 88 in a short period of time. Another significant benefit is that this solution allows for onshore prefabrication and for a full system check to be performed onshore, or in shallow water inshore, before tow-out to an offshore location.

As is conventional, the superstructure 90 has tapered ends to protect the unit 84 against over-trawling. Removable GRP cover panels may be provided on the superstructure to minimise snagging risks and beneficially to reduce hydrodynamic flow of water within the unit as the unit moves through the water during installation.

Some cover panels, particularly on the sides of the superstructure, can be removed after installation to facilitate ROV access. Also, the upwardly-facing cover panels 92 on top of the superstructure 90 can be opened to provide apertures for access to the processing modules supported in upwardly-opening silos on the steel deck 88 beneath.

The processing modules are retrievable from their silos by being lifted through the apertures as shown in FIG. 4, which shows a module 94 comprising a flowmeter 70 being lifted by a wire 96 hanging from a winch or crane of a surface vessel, not shown. A work-class ROV (WROV) 98 is shown performing and supervising the necessary subsea connection, guiding and monitoring operations. It will be apparent that the aforementioned optional onboard removable sand storage tank may be lifted and replaced in a similar fashion.

More generally, subsea processing systems 84 of the invention can comprise a variety of processing modules depending upon the type of processing needed for a particular field development. To reduce costs, standardised modular designs are preferably used throughout the system of the invention. This allows providers of subsea processing equipment to develop their own system modules, and thereafter those modules can be integrated into the subsea processing unit 84 in much the same way as topside platform modules.

Standardised transport and installation frames 100 surrounding the required modules can be installed into the subsea processing unit 84 in a plug-and-play fashion. Such frames 100 also help to reduce variations in terms of handling and installation procedures.

Installation and retrieval of modules may be performed according to the following simplified process:

1. A module such as a flowmeter module 94 including a transport and installation frame 100 is lowered from a vessel through a moonpool of the vessel, where possible, to reduce weather dependency. Alternatively the module 94 may be lowered over the side of the vessel.
2. The WROV 98 guides the module 94 into an appropriate silo of the subsea production unit 84 through the top of the unit 84. No guide wires are required. A handle may be provided on the module 94 for the WROV 98 to grab to apply lateral guide forces to the module 94. Upwardly-extending guide formations around the silo guide the transport and installation frame 100 into the correct position in the unit 84, while also aligning piping and electrical connectors between the unit 84 and the module 94.

3. Once aligned, the module 94 is lowered further into the silo of the unit 84. Dampers are suitably provided to ensure that the module 94 will stop softly some 300 mm above the mechanical connectors. The WROV 98 will then lower the module 94, for example by a screw mechanism or hydraulically, and mate the connectors in a fully controlled manner.

4. Depending on the module 94, various connections will be necessary, for example electrical connections, hydraulic connections and piping. Normally, such connections will be vertically-oriented, coming up from main piping that runs at the level of the deck 88. Pipe connections may be made by standard clamp connectors actuated by the WROV 98.

The water management system of the invention does not need pumps or compressors demanding a large power supply. However some units such as flowmeters, oil-in-water meters and remote-controlled valves will require control cables and minor power cables. Wet-mate connectors are available for this purpose. In this way, power can easily be provided in-field from a central power station to remotely-located water management systems.

Figure 6:
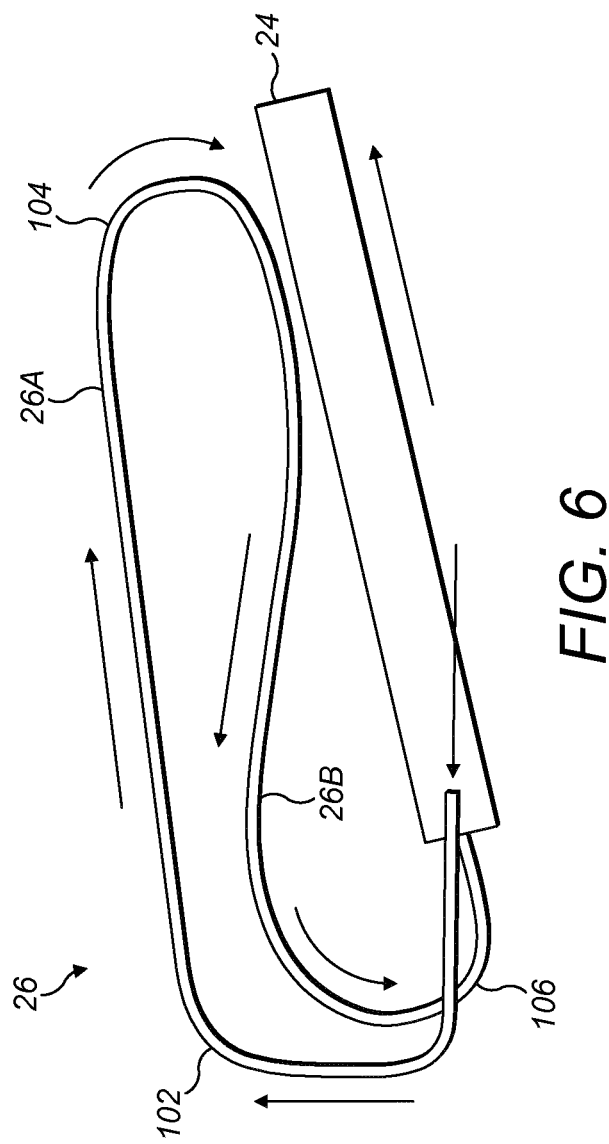
FIG. 6 is a schematic detail side view showing the compact arrangement of a pre-separator pipe section and a dual pipe separator in the layout shown in FIG. 5.

Turning next to the layout of the modules shown in FIG. 5 and schematically in FIG. 6, a harp gas separator 22 and an array of parallel DPSs 24 are shown side-by-side. The DPSs 24 of the array are substantially parallel to each other, lying side-by-side in an inclined plane that rises longitudinally with respect to the underlying deck 88 of the subsea processing unit 84 shown in FIG. 4.

The gas separator 22 and the DPSs 24 are centralised lengthwise with respect to the subsea processing unit 84. Centralising these large masses in longitudinally-inboard positions in this way improves the stability of the unit 84 during transportation and installation. In this respect, it will be noted that smaller, lighter modules such as the CFUs 58 and the flowmeter 70 are at longitudinally-outboard positions with respect to the gas separator 22 and the DPSs 24.

The wellstream flows through the gas separator 22 in a first longitudinal direction. The degassed wellstream fluid flowing out of the gas separator 22 then enters a branch or manifold 102 that divides that fluid into a number of flowpaths corresponding to the number of DPSs 24 in the array. The manifold 102 also reverses the flow direction into a second longitudinal direction opposed to the first longitudinal direction.

Before reaching the respective DPSs 24, the flowpaths first follow respective pre-separator pipe sections 26 that, in this example, are collapsed longitudinally by being bent or folded sinuously. This defines upper and lower portions 26A, 26B of the pre-separator pipe sections 26 that are in mutually-stacked, vertically-spaced relation, and that have mutually-opposed shallow inclination. In this respect, reference is made to the schematic detail view of FIG. 6.

More specifically, each pre-separator pipe section 26 comprises an upper portion 26A in which the wellstream fluid flows in the second longitudinal direction from a manifold end adjacent the liquid outlet of the gas separator 22. The upper portion 26A is inclined upwardly in the second longitudinal direction, corresponding to the flow direction in that portion.

A first downward bend 104 at the other end of the upper portion 26A joins the upper portion 26A to the lower portion 26B, reversing the flow between the upper and lower portions 26A, 26B. Consequently, the wellstream fluid flows in the lower portion 26B in the first longitudinal direction, generally parallel to the flow in the gas separator 22. The lower portion 26B is inclined upwardly in the first longitudinal direction, again corresponding to the flow direction in that portion.

The lower portion 26B, in turn, ends in a second downward bend 106 that is longitudinally opposed to the first downward bend 104 and that is disposed under the end of the upper portion 26A adjacent to the manifold 102. The second downward bend 106 joins the lower portion 26B to the inlet of the associated DPS 24 and again reverses the flow between the lower portion 26B and the DPS 24. Thus, the wellstream fluid flows through the DPS 24 in the second longitudinal direction. The resulting reversal of flow between the gas separator 22 and the array of DPSs 24 facilitates the compact side-by-side disposition of those bulky components.

In this example, the length of the system is also minimised relative to the use of a standard pipe separator in other ways. Firstly, the inclination of the DPSs 24 shortens their overall length parallel to the length of the subsea processing unit 84, while maintaining their effective length. Secondly, the reversal of flow direction in the pre-separator pipe sections 26A, 26B approximately halves their overall length parallel to the length of the unit 84 compared with their effective length. Thirdly, most of the upper and lower portions 26A, 26B of the pre-separator pipe sections 26 are stacked above the DPSs 24 rather than being offset longitudinally from the DPSs 24, benefitting from the space allowed by the inclination of the DPSs 24.

Conventionally, large specialist offshore construction vessels are used for the installation of heavy subsea structures by lifting. Because of their size, such structures are often split into smaller components, hence requiring multiple operations for installation and connection. This increases the number of offshore operations and the need for subsea connection work. The resulting dependence on favourable weather for installation becomes an important factor in the cost and risk of an installation project.

By combining components such as a manifold, sand removal unit, harp gas separator, parallel DPSs and serial CFUs in a supporting frame 86 as a subsea processing unit 84, offshore lifting operations and subsea connection operations are minimised. However, the size and weight of the unit 84 means that it can only be lifted by relatively few available heavy-lift vessels.

Consequently, other methods of installation are preferred for the purposes of the invention, such as the towed production systems exemplified in WO 2014/095942 and WO 2016/071471. In this approach, large subsea processing plants may be assembled in coastal yards as subsea production units 84.

Having assembled and tested the system, the subsea production unit 84 can be towed to field using the well-proven Controlled Depth Towing Method (CDTM). This reduces the cost and risk of installation compared to lift solutions, due to the reduced need for installation resources.

A controlled-depth tow can be performed in a higher sea states than offshore lifting operations and minimises the field access requirements significantly. Use of towing installation methods for subsea production units 84 reduces the environmental impact and the risk to personnel by minimising the exposure of components. The towing and lowering operations impose lower dynamic installation forces on the unit 84 than for installation by lifting. The duration and cost of the installation operation can be reduced greatly.

Figure 7:
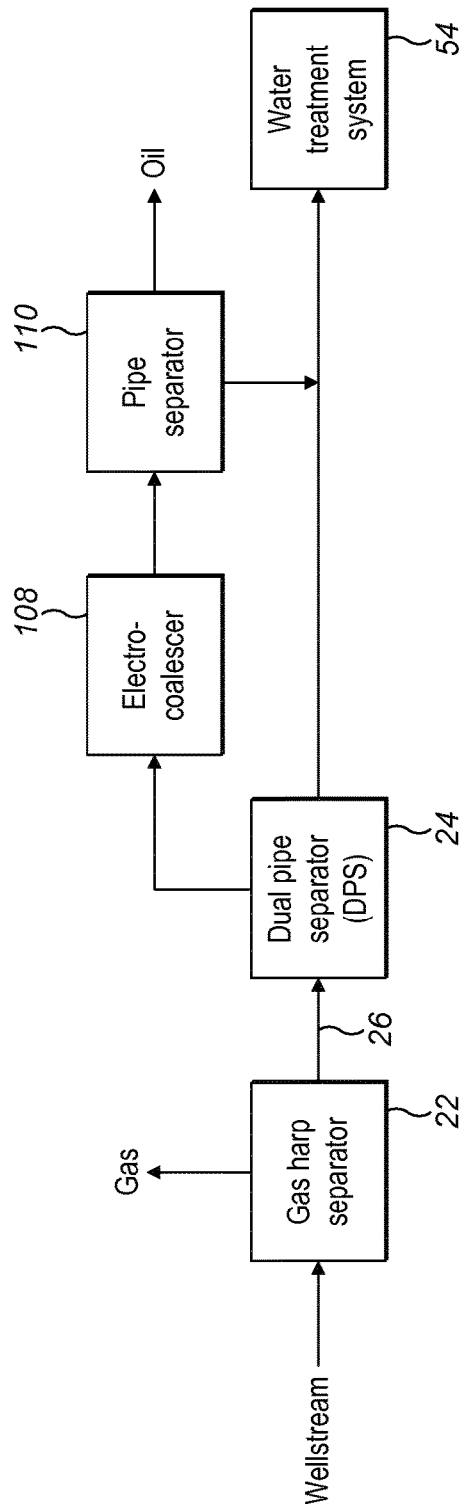
FIG. 7 is a block diagram of alternative subsea degassing and water separation facilities, showing an additional pipe separator stage for water separation.
Figure 8:
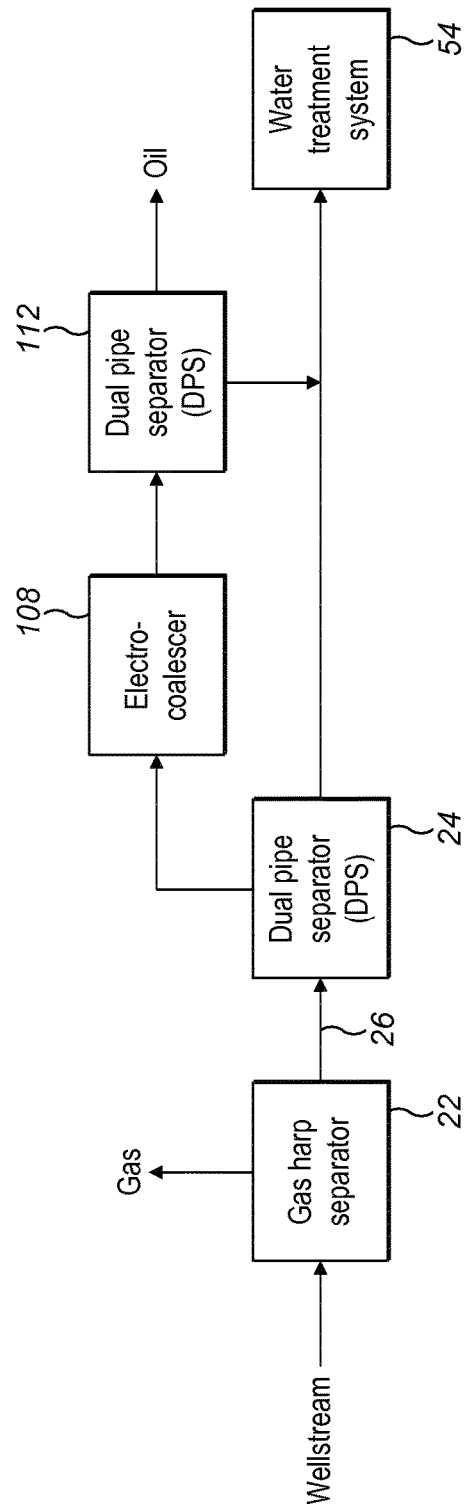
FIG. 8 is a block diagram corresponding to FIG. 7 but showing an additional dual pipe separator stage for water separation.
Figure 9:
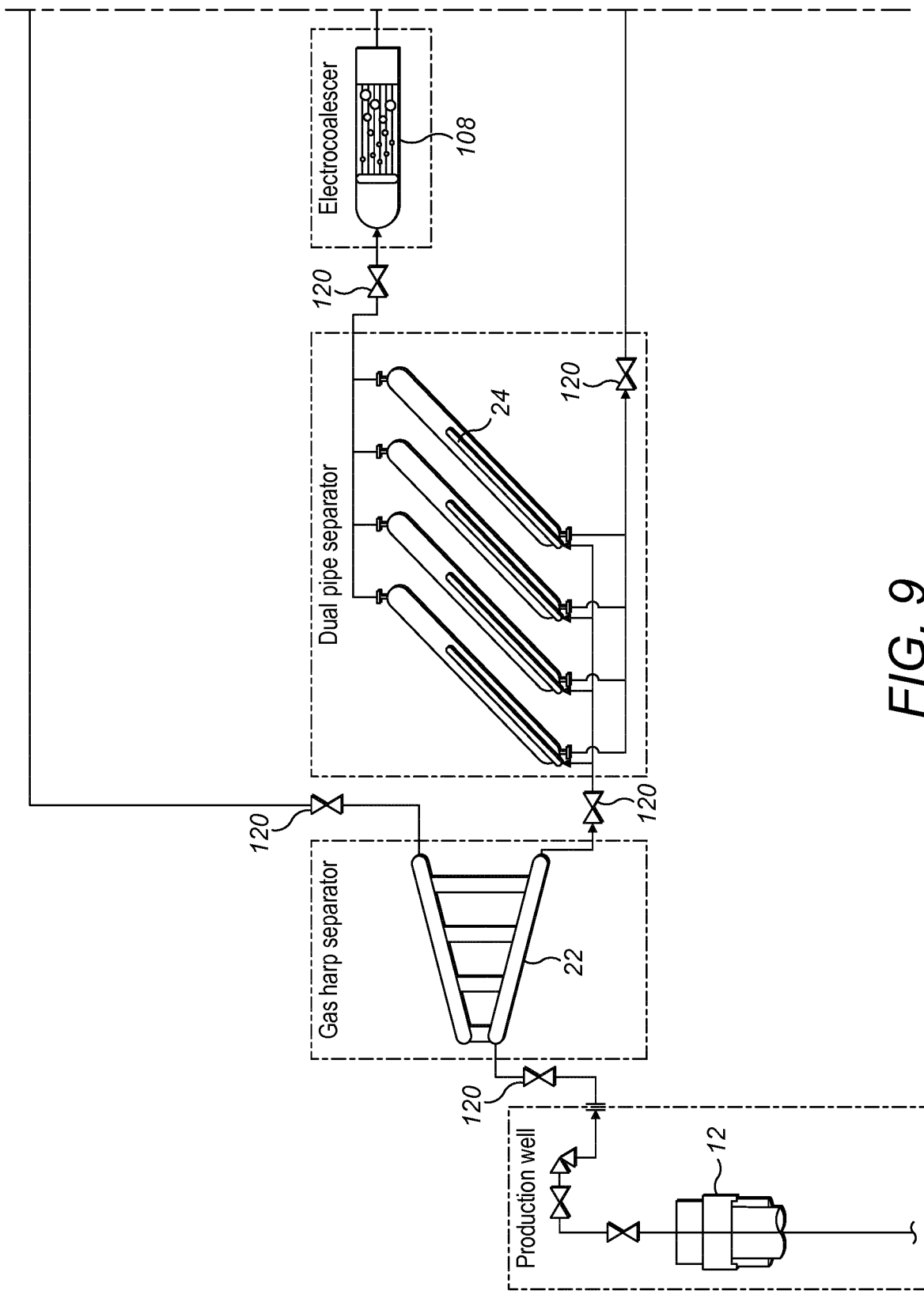
FIG. 9 is a schematic process flow diagram corresponding to the arrangement shown in FIG. 8.
Figure 9:
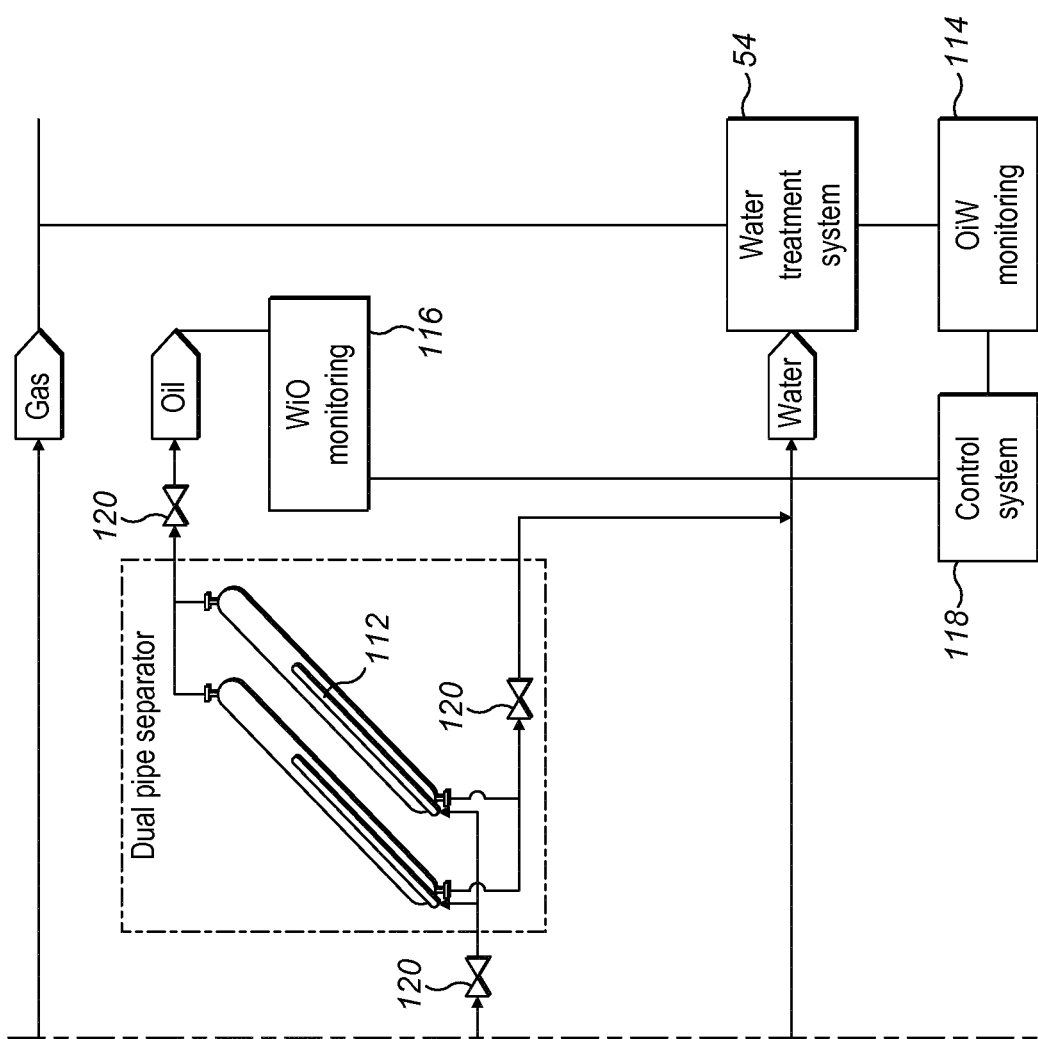

Many variations are possible within the inventive concept. For example, FIGS. 7, 8 and 9 show improved water separation systems in which the oil output of the DPS 24 is subjected to a second stage of water separation. These variants are apt to be used in, or in conjunction with, subsea processing units 84 like that shown in FIG. 4 but they may also have wider application. Again, like numerals are used for like features.

In each of FIGS. 7, 8 and 9, a wellstream enters a harp gas separator 22 that performs bulk gas separation. The wellstream is preferably de-sanded beforehand but that step has been omitted in these drawings for simplicity. As before, the separated wet gas is channelled away for subsequent use in a water treatment system 54 to clean oil from the produced water, and optionally also for re-injection into a well.

The degassed wellstream then passes through a DPS 24 that is suitably preceded by a pre-separator pipe section 26 as before. The pre-separator pipe section 26 shown in FIGS. 7 and 8 is omitted from FIG. 9 but is optional. In practice, the pre-separator pipe section 26 and the DPS 24 may be shaped and positioned compactly relative to each other like the corresponding components shown in FIGS. 5 and 6.

In the variants shown in FIGS. 7, 8 and 9, the second stage of water separation is performed by an electrocoalescer 108 downstream of the DPS 24 in combination with a further liquid-liquid separator in series with, and downstream of, the electrocoalescer 108. That further liquid-liquid separator is exemplified by a pipe separator 110 in FIG. 7 and by a DPS 112 in FIGS. 8 and 9. The latter option is preferred for efficiency and compactness.

In each case, the further liquid-liquid separator 110/112 outputs:
  oil containing a reduced water fraction, which oil may be sent to a tank 46 as shown in FIG. 1 for settling, if necessary, and for periodic offloading; and
  oily water that is added to the oily water output from the DPS 24 in the first separation stage, before treatment in a water treatment system 54 that is preferably like that described above in relation to FIG. 1.

By promoting coalescence of smaller oil droplets into larger oil droplets, the electrocoalescer 108 conditions the mixture of oil and water flowing from the first-stage DPS 24 to improve the effectiveness of the further liquid-liquid separator 110/112 downstream in the second stage.

Synergistically, by dewatering the wellstream and by modifying the flow, the first-stage DPS 24 improves the effectiveness of the electrocoalescer 108 and hence, in turn, the effectiveness of the further liquid-liquid separator 110/112 downstream in the second stage.

Also synergistically, by degassing the wellstream upstream of the first-stage DPS 24 and by modifying the flow, the gas separator 22 improves the effectiveness of the electrocoalescer 108 and hence, in turn, the effectiveness of the further liquid-liquid separator 110/112 downstream in the second stage.

These synergies combine beneficially with the aforementioned synergy between the gas separator 22 and the first-stage DPS 24, which as noted previously improves the effectiveness of the first-stage DPS 24.

The result of these various synergies is that substantially more water is removed from the oil in the wellstream than if only one liquid-liquid separation stage was used.

Similarly, substantially more water is removed from the oil in the wellstream than if successive liquid-liquid separation stages were used without the intermediate step of promoting coalescence. Also, substantially more water is removed from the oil in the wellstream than if the preliminary degassing step was omitted before the, or the first, liquid-liquid separation stage.

By virtue of containing substantially less water, the oil output from the further liquid-liquid separator 110/112 is less susceptible to the formation of hydrates or other solids that could subsequently plug a pipeline or other production equipment.

A challenging consequence of the improved separation of water from the oil in the wellstream is that more water has to be cleaned, preferably subsea by the water treatment system 54. The preferably two-stage operation of the water treatment system 54 and the use of CFUs, as described above in relation to FIG. 1, is beneficial to handle this increased flow of water while ensuring that the OiW ratio is sufficiently low to allow for re-injection or discharge of that water as the case may be.

FIG. 9 shows that the first-stage DPS 24 shown schematically in FIGS. 7 and 8 is preferably an array of parallel, manifolded DPSs 24, in this example an array of four DPSs 24. FIG. 9 also shows that the second-stage DPS 112 is preferably also an array of parallel, manifolded DPSs 112, in this example a pair of two DPSs 112. The DPSs 112 of the second stage are fewer in number than the DPSs 24 of the first stage to reflect that less water is present to be separated from the oil in the second stage than in the first stage.

FIG. 9 also shows, schematically, provisions for controlling the separation and treatment system to maintain appropriate output characteristics. Similar provisions may of course be added to the system shown in FIG. 1. In this respect, an Oil-in-Water sensor 114 monitors the OiW ratio in water produced by the water treatment system 54 and a Water-in-Oil sensor 116 monitors the WiO ratio in oil exiting the second-stage DPSs 112. Optionally, a further Water-in-Oil sensor may monitor the WiO ratio in oil exiting the first-stage DPSs 24. Both sensors 114, 116 report to a control system 118 that, in turn, controls appropriate valves 120 to modify the flow of fluids in the system, if required, to maintain the desired output characteristics.

The invention claimed is:

1. A subsea multiphase fluid separation system, the system comprising:
  a gas separator for separating gas from a wellstream containing oil;
  a water separation stage downstream of the gas separator, comprising a first array of parallel dual pipe separators for separating water from the oil of the wellstream, an electrocoalescer downstream of the first array of parallel dual pipe separators on an oil outlet path, and at least one second separator comprising a second array of parallel dual pipe separators downstream of, and in series with, the electrocoalescer, wherein the dual pipe separators are inclined and each comprise a perforated inner pipe contained within an outer pipe;
  a water treatment system for cleaning oil from water that is produced by the water separation stage; and
  a water-in-oil sensor downstream of the water separation stage.

2. The system of claim 1, wherein the gas separator and the water separation stage are arranged without moving parts to separate gas and water from the wellstream passively.

3. The system of claim 1, wherein the water treatment system is connected to water outlet paths from the or each dual pipe separator and from the or each second separator.

4. The system of claim 1, wherein the second array contains fewer dual pipe separators than the first array.

5. The system of claim 1, comprising an oil-in-water sensor downstream of the water treatment system.

6. The system of claim 1, wherein the water treatment system comprises a gas inlet communicating with the gas separator and is arranged to mix the produced water with gas separated from the oil.

7. The system of claim 1, wherein the water treatment system has an input to receive water settling in a storage tank.

8. The system of claim 1, wherein the water treatment system comprises at least one flotation unit having: a water inlet for water to be cleaned of oil; a water outlet for water cleaned of oil; and a reject outlet for gas mixed with oil cleaned from the water.

9. The system of claim 8, wherein the water treatment system comprises first and second flotation units in series, the water outlet of the first notation unit communicating with the water inlet of the second flotation unit.

10. The system of claim 8, wherein the water inlet of the or each flotation unit communicates with a mixer for mixing gas with water to be cleaned of oil.

11. The system of claim 1, wherein the water treatment system comprises a discharge outlet for discharge of cleaned water into surrounding seawater.

12. The system of claim 1, wherein the water treatment system communicates with mater injection system for injecting the clewed water into a subsea reservoir.

13. The system of claim 12, wherein the water injection system comprises a gas inlet communicating with the gas separator and is arranged also to receive and inject gas separated from the wellstream.

14. The system of claim 12, wherein the water injection system comprises a processed water inlet communicating with a seawater processing system and is arranged also to receive and inject processed water drawn from surrounding seawater.

15. The system of claim 1, further comprising a pre-separator pipe section upstream of the or each dual pipe separator.

16. The system of claim 1, further comprising a sand removal unit upstream of the gas separator.

17. The system of claim 16, further comprising a retrievable sand storage tank for receiving sand from the sand removal unit.

18. The system of claim 1, wherein the gas separator, the water separation stage and the water treatment system are implemented on a common supporting frame.

19. The system of claim 18, wherein components of the gas separator, the water separation stage and the water treatment system are modularly replaceable subsea by lifting, without lifting the frame.

20. The system of claim 19, wherein the frame defines upwardly-opening silos arranged to accommodate the respective components.

21. The system of claim 20, wherein the components are supported in respective transport and installation structures that are engageable with the silos of the frame for vertical movement relative to the frame on installation or removal.

22. The system of claim 18, wherein the frame is a unitary structure that is transportable by towing or lifting while supporting components of the gas separator, the water separation stage and the water treatment system.

* * * * *